United States Patent
Baughman et al.

(10) Patent No.: US 9,951,466 B2
(45) Date of Patent: Apr. 24, 2018

(54) HIGH-HEAT DELIVERY DEVICE

(71) Applicant: DSM IP ASSETS B.V., Heerlen (NL)

(72) Inventors: Travis Baughman, Echt (NL); Robin Elisabeth Maria Jacobus Daenen, Echt (NL); Alexander Antonius Marie Stroeks, Echt (NL); Franciscus Johannes Marie Derks, Echt (NL); Pieter Gijsman, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 23 days.

(21) Appl. No.: 14/914,414

(22) PCT Filed: Aug. 29, 2014

(86) PCT No.: PCT/EP2014/068417
§ 371 (c)(1),
(2) Date: Feb. 25, 2016

(87) PCT Pub. No.: WO2015/028632
PCT Pub. Date: Mar. 5, 2015

(65) Prior Publication Data
US 2016/0201256 A1    Jul. 14, 2016

(30) Foreign Application Priority Data
Aug. 30, 2013   (EP) .................... 13182501

(51) Int. Cl.
*D06F 75/38*   (2006.01)
*D06F 75/24*   (2006.01)
(Continued)

(52) U.S. Cl.
CPC .............. *D06F 75/38* (2013.01); *A45D 1/00* (2013.01); *A45D 2/00* (2013.01); *A45D 2/001* (2013.01); *C09K 5/14* (2013.01); *D06F 75/24* (2013.01)

(58) Field of Classification Search
CPC .......... D06F 75/00; D06F 75/38; D06F 75/24; A45D 1/00; A45D 2/00; A45D 2/001; C09K 5/14
See application file for complete search history.

(56) References Cited

U.S. PATENT DOCUMENTS 3,099,540 A * 7/1963 Eisler ................ H05B 3/26
                                                  219/211
3,760,495 A   9/1973 Meyer
(Continued)

FOREIGN PATENT DOCUMENTS

JP         04367611 A  * 12/1992
JP        2007-098064      4/2007
(Continued)

OTHER PUBLICATIONS

International Search Report and Written Opinion of the ISA for PCT/EP2014/068147, dated Jan. 19, 2015, 9 pages.

*Primary Examiner* — Ismael Izaguirre
(74) *Attorney, Agent, or Firm* — Nixon & Vanderhye P.C.

(57) ABSTRACT

The present invention relates to a high-heat-delivery device suitable for use in an hair straightener, a hair curling iron or an ironing apparatus and suitable for heat transfer to a substrate by direct contact with said substrate, comprising at least one element (A) having a heat transfer contact surface area and at least one element (B) having a heat transfer contact surface, wherein the element (A) comprises a thermoconductive thermoplastic polymer composition comprising at least one polymer and a thermoconductive additive and wherein element (B) comprises a thermoplastic polymer composition comprising a polymer and at least one thermo-releasable substance. Further, the present invention relates to a method for releasing a thermo-releasable substance. Furthermore, the present invention relates to an ironing appa- (Continued)

ratus, a hair straightener and a hair curling iron comprising the high-heat delivery device.

19 Claims, 1 Drawing Sheet

(51) Int. Cl.
    *A45D 1/00*     (2006.01)
    *A45D 2/00*     (2006.01)
    *C09K 5/14*     (2006.01)

(56) References Cited

U.S. PATENT DOCUMENTS

| | | | |
|---|---|---|---|
| 4,117,612 A * | 10/1978 | Baumgartner | D06F 75/08 38/91 |
| 4,800,661 A | 1/1989 | Yamamoto et al. | |
| 5,057,903 A * | 10/1991 | Olla | H01L 23/367 257/707 |
| 5,804,791 A * | 9/1998 | Gelus | D06F 75/24 219/245 |
| 6,622,735 B2 | 9/2003 | Hirata et al. | |
| 2003/0031876 A1 * | 2/2003 | Obeng | B24B 37/042 428/423.1 |
| 2005/0228093 A1 * | 10/2005 | Yamazaki | C08K 3/38 524/404 |
| 2008/0041408 A1 | 2/2008 | Shepherd et al. | |
| 2008/0196282 A1 * | 8/2008 | Jiang | D06F 75/26 38/77.7 |
| 2011/0279035 A1 * | 11/2011 | Van Dijk | F21S 48/328 315/112 |

FOREIGN PATENT DOCUMENTS

| | | |
|---|---|---|
| WO | WO 2009/078046 | 6/2009 |
| WO | WO 2016128347 * | 8/2016 |

* cited by examiner

HIGH-HEAT DELIVERY DEVICE

This application is the U.S. national phase of International Application No. PCT/EP2014/068417 filed 29 Aug. 2014, which designated the U.S. and claims priority to EP Patent Application No. 13182501.0 filed 30 Aug. 2013, the entire contents of each of which are hereby incorporated by reference.

FIELD

The present invention relates to a high-heat delivery device. Furthermore, the present invention relates to an ironing apparatus, a hair straightener and a hair curling iron comprising the high-heat delivery device.

BACKGROUND AND SUMMARY

An efficient heat transfer to a substrate is difficult to carry out. Suitable heating may require very high temperatures if the heat transfer is not efficient enough. Most heating apparatuses comprise a heated metallic plate brought into contact with a substrate to be heated.

Transferring heat onto a substrate can damage the substrate. In particular, contacting a substrate at high temperatures, such as temperatures above 150° C. can cause burns to the substrate. A particular example is the application of hair straighteners, wherein hair to be straightened is submitted to high temperatures and result in substantial damaging of the hair, such as scorching, split ends, breakage, sharp bends, etc.

U.S. Pat. No. 6,622,735 describes a hair iron comprising a hair heating surface and a pressing surface of an iron covered with iron press covers made from a woven or nonwoven cloth of heat-resistant synthetic fibers.

US 2008/0041408 recites a hair styling apparatus that has a heating member and a polytetrafluoroethylene cloth covering the heating member.

It is thus an object of the present invention to provide a high-heat delivery device which efficiently transfers heat at temperatures equal to or above 150° C. to a substrate while causing less damage to the substrate.

The object is met by the high-heat-delivery device suitable for heat transfer to a substrate by direct contact with said substrate, comprising at least one first element (A) having a heat transfer contact surface area, wherein the first element (A) comprises, or is made of, a thermoconductive thermoplastic polymer composition comprising at least one polymer and a thermoconductive additive. The device according to the present invention achieves the aim of efficiently providing the required heat to a substrate while causing less damage to said substrate.

In an embodiment of the present invention, the device further comprises at least one element (B) having a heat transfer contact surface area, the element (B) comprising a polymer composition comprising at least one polymer and at least one thermo-releasable substance. In this embodiment, an element (B) together with element (A) of the device, allows the release of a substance onto, or into, the substrate. The release of the thermo-releasable substance is carried out with the heating of element (B). The term 'thermo-releasable' is to be understood as the release of a substance under the effect of heat.

DETAILED DESCRIPTION OF THE PREFERRED EMBODIMENTS

Figure 1:
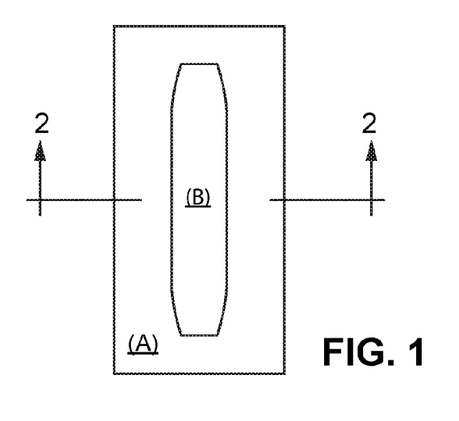
FIG. 1 is a schematic top view of a high-heat delivery device according to an embodiment of the present invention comprising a first element (A) and a second element (B)
Figure 2:
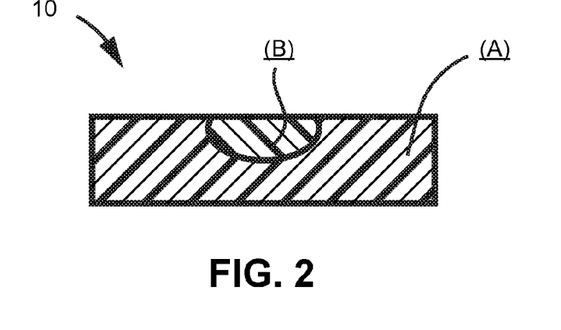
FIG. 2 is a transverse view of the high-heat delivery device shown in FIG. 1 as taken along lines 2-2 therein.

As is schematically depicted in FIGS. 1-2, the device 10 according to the present invention, provides heat to a substrate (not shown) through first and second elements (A) and (B), respectively, which are heated. As depicted in FIG. 2, the second element (B) is embedded within the first element (A).

In an embodiment according to the present invention, the second element (B) comprises a thermoconductive additive. The second element (B) accordingly comprises a thermoconductive thermoplastic polymer composition.

In yet another embodiment according to the present invention, the first element (A) comprises at least one thermo-releasable substance.

When the composition is a thermoconductive thermoplastic polymer composition comprising a thermo-releasable substance, the release of the thermo-releasable substance is carried out in a homogeneous manner onto, or into, the substrate. The presence of a thermoconductive polymer with a thermo-releasable surface is advantageous when simultaneously release and heating of the substrate is desired. When the composition of at least one of elements of the device comprises a substance which is thermally releasable, the substance is simultaneously released when heat is transferred to the substrate and can further provide care to the substrate.

In the context of the present invention, the presence of a second element (B) allows the device to comprise two elements having different composition.

In one embodiment of the present invention, wherein the first element (A) and/or the second element (B) further comprises at least one thermo-releasable substance. The released thermo-releasable substrate, such as fragrance, oil or another care substance provided to the substrate allows treating the substrate. Therefore, in this embodiment, the device allows heating of the substrate while damaging the substrate less, but it also provides care to the substrate by the heating of the device. In the context of the present invention, the substrate can therefore be treated by the thermo-releasable substance, while the heat is transferred. The treatment or care of the substrate may render an additional treatment of the substrate unnecessary. Therefore, when using a hair styling apparatus comprising the high-heat delivery device according to the present invention, the released substance conditions he hair, so that no additional protective hair spray is required before styling.

In another embodiment of the present invention, the at least one second element (B) is partially embedded in element (A). The term 'embedded' is to be understood as being "physically included into". In the context of the present invention, the at least one second element (B) is at least partially included into the first element (A). In other words, the at least one second (B) is included into the first element (A), but at least a portion of the second element (B) provides the second element (B) with a heat transfer contact surface area with the substrate.

In the context of the present invention, the term 'high-heat' is to be understood as a temperature of at least 150° C., preferably 170° C., more preferably at least 180° C. and most preferred at least 190° C. An upper limit for the temperature for these applications usually is at most 240° C., preferably at most 230° C. and most preferred at most 220° C.

In the context of the present invention, the high-heat delivery is to be understood as the delivery of heat from the device onto a substrate by direct contact with the substrate. The device according to the present invention is therefore a heating device.

When a device is placed into or onto a hair styling apparatus, the device provides the advantage of reducing physical damages to the hair caused by styling at high temperatures, such as split ends, dryness, breakage. Further because the device according to the present invention is made of elements as described herein, the heat is more controllably transferred to the substrate.

In the context of the present invention, the term 'device' is to be understood as heating member comprising the at least one element according to the present invention. In particular, the device may be designated as a sleeve having a substantially rectangular shape, a substantially cylindrical shape, a substantially triangular shape or any geometrical shape suitable to fix the device into or onto an apparatus for providing heat, such as a hair styling apparatus, or an iron for removing wrinkles from fabrics.

The device provides the advantage that the heat is transferred from the hair styling apparatus, or iron for removing wrinkles from fabrics, through the device and therefore transfers the heat to the substrate (such as hair or a piece of fabric). The advantage of the high-heat delivery devices according to the present invention is that high-heat is transferred to the substrate while less damaging occurs, such as burning or any damage caused by excessive temperature, the substrate. The total thickness of the device (thickness of elements (A) and/or (B)) is advantageously in the range 0.5 to 5 mm, more advantageously 0.7 to 3 mm, most advantageously 1 to 2 mm. This particular thickness range provides the advantage of having particularly efficient heat delivery.

The term 'by direct contact' is to be understood in the context of the present invention as a contact without any intermediary layer between the device according to the present invention and the substrate to be heated. Accordingly, the device according to the present invention enters in contact with the substrate to which the heat has to be transferred. Accordingly, the device according to the present invention transfers the heat to the substrate via direct contact from the substrate, without an intermediary cloth between the device and the substrate.

In the context of the present invention, the substrate has a surface to be heated. The substrate can be of any material. When the high-heat delivery device is part of a hair styling apparatus, such as a hair straightener, a hair curling iron, or a hair waving apparatus, the substrate is hair. In the context of the present invention, the device being part of a hair styling apparatus allows the direct contact with the hair to style, dry, straighten, or wave without damaging the hair. The device can be applicable into or onto the hair styling apparatus. The hair may be clamped between two devices according to the present invention when the device is part of a straightening iron. The hair may be fixed around the device if the device is a cylinder piece of a curling iron.

When the high-heat delivery device is used in an ironing apparatus, the substrate is a fabric, or a piece of clothing from which wrinkles have to be removed.

In the context of the present invention, the device comprises at least one element, such as one element, two elements, three elements, four elements or more.

The elements have a surface area which enters in contact with the substrate and transfers the heat. In the present invention, the surface area is to be understood as the total area of the faces and curved surface of the element.

The first element (A) comprises a thermoconductive thermoplastic polymer composition comprising at least one thermoplastic polymer and at least one thermoconductive additive. The second element (B) comprises a thermoconductive thermoplastic polymer composition comprising at least one thermoplastic polymer, at least one thermo-releasable substance and optionally at least one thermoconductive additive.

Accordingly, the device can comprise at least two elements, one of which may release a substance when providing heat to the device.

In the context of the present invention, the thermoconductive thermoplastic polymer composition in the first and/or second elements (A) and/or (B), respectively, comprises at least one thermoplastic polymer. The thermoplastic polymer composition in the first and/or second elements (A) and/or (B), respectively, is a halogen-free thermoplastic polymer, such as fluorine-free or chlorine-free thermoplastic polymer. The thermoconductive thermoplastic polymer composition can be selected from polyamides; polyesters; polyarylene sulfides such as polyphenylene sulfides; polyarylene oxides such as polyphenylene oxides; polysulfones; polyarylates; polyimides; poly(ether ketone)s such as polyetheretherketones; polyetherimides; polycarbonates, copolymers of said polymers among each other and/or with other polymers, including thermoplastic elastomers such as copolyetherester block copolymers, copolyesterester block copolymers, and copolyetheramide block copolymers; and mixtures of said polymers and copolymers. The thermoplastic polymer suitably is an a semi-crystalline or a liquid crystalline polymer, a thermoplastic elastomer, or a combination thereof.

Preferably, the thermoplastic polymer is chosen from the group consisting of polyamides, polyesters, polyphenylene sulphides, polyphenylene oxides, polysulfones, polyarylates, polyimides, polyetheretherketones, and polyetherimides, and mixtures and copolymers thereof. Advantageous results are obtained when the polymer in the first and/or second elements (A) and/or (B), respectively, is selected from the group consisting of polyamides, polyesters, polyphenylene sulphides, polyphenylene oxides, polysulfones, polyarylates, polyimides, polyetheretherketones and polyetherimides, and mixtures thereof and copolymers thereof.

More preferably, the thermoplastic polymer comprises a polyamide. Thermoplastic polyamides have the advantage of having good thermal properties and mould filling characteristics. Also still more preferably, the thermoplastic polymer comprises a polyamide with a melting point of at least 200° C., more preferably at least 220° C., most preferred at least 230° C. Polyamides with a higher melting point have the advantage that the thermal properties are further improved. With the term melting point is herein understood the temperature measured by DSC with a heating rate of 5° C. falling in the melting range and showing the highest melting rate.

In the context of the present invention, the thermoconductive thermoplastic polymer compositions comprise a thermo conductive additive.

A thermoconductive additive within the meaning of the present invention includes any material that can be dispersed in the at least one thermoplastic polymer and has a thermal conductivity λ (W/m·K) that is at least 5 times, preferably at least 10 times, more preferably at least 25 times higher than the thermal conductivity of the at least one thermoplastic polymer.

Thermo conductive additives are known to a person skilled in the art and include metals, ceramics or carbon. Specifically, examples of common thermally conductive additives include aluminium, alumina, copper, magnesium, brass, carbon such as carbon black and graphite, silicon nitride, aluminium nitride, boron nitride, zinc oxide, glass, mica, titanium oxide, calcium oxide and boron carbide. Preferably, the device according to the present invention comprises graphite, more preferably expanded graphite.

Preferably the thermo conductive additive is in the form of a graphite powder having the shape of thin platelets. Platelets are herein understood to be particles having a flat shape with a large difference in the three dimensions such that the smallest dimension (the thickness) is much smaller than the size of the particles in the other two dimension (the length and the width). The platelets may consist of one or more individual graphite layers closely packed together.

The thickness (smallest dimension) of the platelets is less than 500 nm, preferably less than 200 nm, more preferably less than 100 nm, even more preferably less than 80 nm, and most preferably less than 50 nm. For the sake of clarity it is noted that the platelets do not need to have a flat structure. Due to the very low thickness these might be bended, curved or waved or deformed otherwise as well.

The thickness of the platelets can be determined by standard methods, such as by electron microscopy.

The term graphite powder comprising platelets of less than 500 nm, if not indicated otherwise, this is intended to include the preferred embodiments of thinner platelets as well. This graphite powder will also be indicated as graphite powder in the form of thin platelets.

The thermo conductive additive being graphite powder surprisingly imparts to a thermoplastic polymer a relatively high thermal conductivity already at a relatively low weight percentage. It is sufficient to load the thermoplastic polymer with 5 to 40% by weight of the graphite powder, based on the total weight of the polymer composition, in order to obtain a polymer composition with reasonable thermal conductivity values. Preferably, the thermally conductive polymer composition according to the present invention comprises 10 to 30% by weight of the graphite powder, based on the total weight of the polymer composition. Due to the relatively low amount of thermo conductive additive the present polymer composition has better flow and mechanical properties than most known thermally conductive polymer compositions requiring high amounts of thermo conductive additive in order to obtain reasonable conductivity values.

Typically, the graphite powder used in the thermo conductive thermoplastic polymer composition is characterized by a relatively high specific surface area in combination with a relatively large particle size. Preferably, the graphite powder has a BET specific surface area of at least 10 m$^2$/g and a particle size distribution characterized by a D(v, 0.9) of at least 50 µm. Normal graphite powders including powders of both synthetic graphites and natural graphites have either a high specific surface area in combination with a low particles size or vice versa a low specific surface area in combination with a large particles size.

The graphite powder used in the thermo conductive thermoplastic polymer composition preferably has BET specific surface area of at least 10 m$^2$/g, more preferably at least 15 m$^2$/g, even more preferably at least 20 m$^2$/g, and most preferably at least 25 m$^2$/g. The BET specific surface area is determined according to ASTM D3037.

The present graphite powder preferably has a particle size distribution characterized by a D(v, 0.9) of at least 50 µm, more preferably at least 60 µm, even more preferably at least 70 µm, and most preferably at least 80 µm. In some embodiments, the particle size distribution is further characterized by a volume median diameter D(v, 0.5) of at least 20 µm, preferably at least 25 µm, more preferably at least 30 µm, and most preferably at least 35 µm. Moreover, the particle size distribution is usually characterized by a D(v, 0.1) of at least 6 µm, preferably at least 7 µm, more preferably at least 8 µm, and most preferably at least 9 µm. In one embodiment the graphite powder has a particle size distribution characterized by a D(v, 0.9) of at least 50 µm, a volume median diameter D(v, 0.5) of at least 20 µm, and a D(v, 0.1) of at least 6 µm. The particle size is not bound by a specific maximum limit, but in practice it will be limited by the minimum specific surface area required. The higher the minimum specific surface area the smaller the particles in general will be and also the smaller the maximum size of the particles.

D(v, 0.9), D(v, 0.5), and D(v, 0.1) are determined by laser diffraction using a Malvern Mastersizer.

Typically, the graphite powder has a xylene density in the range of 2.0-2.4, preferably 2.1-2.3 g/cm$^3$, more preferably 2.20-2.27 g/cm$^3$. A graphite powder suitable as thermo conductive additive in the thermally conductive polymer composition is available from TIMCAL Ltd., Bodio, Switzerland under the trade name TIMREX® BNB90.

The thermoconductive thermoplastic polymer compositions may optionally comprise any auxiliary additives, known to a person skilled in the art that are customarily used in polymer compositions. Preferably, these other additives should not detract, or not in a significant extent, from the invention.

Such additives include non-conductive fillers; pigments; dispersing aids; processing aids for example lubricants, mould release agents, flow additives; impact modifiers; plasticizers; crystallization accelerating agents; nucleating agents; flame retardants; UV stabilizers; antioxidants; heat stabilizers.

Such additives include, in particular, other fillers not considered thermally conductive such as non-conductive reinforcing fillers. The non-conductive fillers that may be used as additives to the thermally conductive polymer composition include non-conductive inorganic fillers. Suitable for use as non-conductive inorganic fillers are all the fillers, such as reinforcing and extending fillers, known to a person skilled in the art, for example asbestos, mica, clay, calcinated clay, talcum, silicates such as wollastonite, and silicon dioxide, especially glass fibres. In this context, "non-thermally conductive" or "non-conductive" is used to describe filler materials having an intrinsic thermal conductivity λ (W/m·K) that is less than 5 times higher compared to the thermal conductivity of the at least one thermoplastic polymer.

In one embodiment the elements of the device according to the present invention comprises a thermoconductive thermoplastic polymer composition further comprising glass fibres, typically 10 to 40% by weight of glass fibres, based on the total weight of the polymer composition including filler and further optional components.

In the context of the present invention, the at least one elements of the device comprises a thermoconductive thermoplastic polymer composition having a through-plane thermal conductivity of between 0.3 to 5 W/m·K, preferably between 0.75 to 3 W/m·K, and more preferably between 0.8 to 2.5 W/m·K.

In the context of the present invention, the device comprises a thermoconductive thermoplastic polymer composition having a high thermal conductivity and good mechanical properties, which can vary over a wide range depending on the amount of the thermo conductive additives, and optional other additives. Due to the graphite powder in the form of thin platelets, already at very low total amount of thermally conductive additive, reasonably high thermal conductivities are obtained, which with many other thermally conductive fillers are reached at much higher contents and at the cost of mechanical properties. At higher total amounts of thermally conductive additives much higher thermal conductivities are obtained compared to other thermally conductive additives when used in similar amounts.

According to one embodiment of the present invention, the high-heat-delivery device 10 includes the first element (A) which constitutes 5-100% of the total heat transfer contact surface area of the first and/or second elements (A) and/or (B), respectively, and the second element (B) which constitutes 95-0% of the total heat transfer contact surface area of first and/or second elements (A) and/or (B), respectively. Advantageously, the high-heat-delivery device 10 includes the first element (A) which constitutes 20 to 80%, preferably 40-60%, most preferably 50% of the total heat transfer contact surface area of first and/or second elements (A) and/or (B), respectively. The second element (B) constitutes 20 to 80%, preferably 40-60%, most preferably 50% of the total heat transfer contact surface area of the first and/or second elements (A) and/or (B), respectively.

In one embodiment of the present invention, the through-plane conductivity of the first element (A) is in the range 0.7 to 3.5 W/mK, at a temperature of 200° C., preferably 1.0 to 2.5 W/mK, more preferably 1.5 to 2.1 W/mK.

In one embodiment of the present invention, the through-plane conductivity of the second element (B) is in the range 0.3 to 2.5 W/mK at 200° C., preferably 0.6 to 2.5 W/mK.

In the context of the present invention, the term 'at least one' is to be understood as one, two, three, four, five, six or more.

Figure 3:
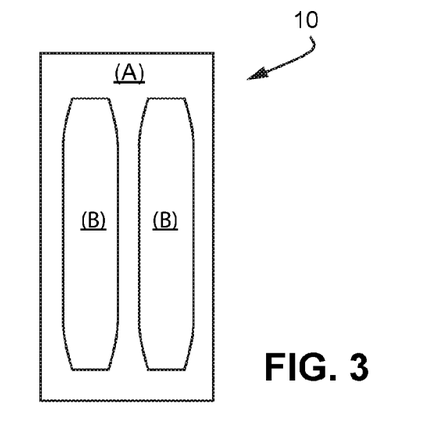
FIG. 3 is a schematic top view of another embodiment of a high-heat-delivery device comprising a first element (A) and two second elements (B) embedded therein.

For example, in one embodiment of the present invention as shown in FIG. 3, the second element (B) is present in two separate portions. Accordingly, in this embodiment, the second element (B) comprises one first element (A) and two second elements (B) separate from each other.

In the context of the present invention, the device comprises at least one of the first and/or second elements (A) and/or (B), respectively, comprising a thermoconductive thermoplastic polymer composition comprising
(i) 30-85 wt. % of at least one thermoplastic polymer, advantageously 40-75 wt. % of the total weight of the composition;
(ii) 5-50 wt. % of a thermoconductive additive, advantageously 15-30 wt. % of the total weight of the composition. Optionally, elements (A) and/or (B) comprise
(iii) 1-25 wt. % of a substance to be released, advantageously 1-20 wt. %, more advantageously 1-7 wt. % of the total weight of the composition.

Accordingly, in one embodiment of the present invention, the high-heat delivery device comprises at least two elements (i.e., one first element (A) and one second element (B)) made of different compositions. The device is suitable for heat transfer to a substrate by direct contact with said substrate, wherein the high-heat-delivery device element (A) comprises a first thermoconductive thermoplastic polymer composition comprising:
  (a) at least one polymer;
  (b) at least one thermoconductive additive;
  (c) optionally a thermo-releasable substance;
wherein high-heat-delivery device element (B) comprises a second thermoconductive thermoplastic polymer composition comprising:
  (i) a polymer;
  (ii) at least one thermo-releasable substance;
  (iii) optionally at least one thermoconductive additive.

As already pointed out above, the device according to the present invention comprises at least one element comprising a thermally conductive polymer composition having good flow properties ensuring a good heat-processability, such as having a spiral flow length of at least 40 mm, more preferably at least 70 mm and most preferably at least 100 mm. The spiral flow length is determined by injecting the molten thermoplastic material into a long spiral-channel cavity having dimensions 280×15×1 mm and the length of the resulting flow for that material is its spiral flow length. The material is injected by using a 22 mm Engel 45B L/d=19 injection moulding machine having a theoretical shot volume of 38 cm$^3$; the cylinder temperature is 10° C. above the melting point of the main polymer component, and the effective injection pressure is 100 MPa.

The high-heat-delivery device according to the present invention is further characterized by being composed of elements made of a material having a reasonable mechanical performance, such as:
  a tensile strength of at least 40 MPa, preferably at least 50 MPa and more preferably at least 60 MPa;
  an elongation at break of at least 0.7%, preferably at least 1.0%, more preferably at least 1.5%, and most preferably at least 2.0%;
  stiffness of at least 4,000 MPa, more preferably at least 6,000 MPa;
  tensile modulus, tensile strength and elongation at break are determined at 23° C. and 5 mm/min according to ISO 527; the dried granulate of the thermoplastic material of the different elements of the device was tested after injection moulding to form the test bars for the tensile tests having a thickness of 4 mm conforming to ISO 527 type 1A.

In the context of the present invention, a thermo-releasable substance is a substance that can be released when heat is provided and includes cosmetically acceptable substances as known in the art. In other words, when the present thermoconductive thermoplastic polymer composition comprising a thermo-releasable substance is heated, said substance is released. In the high-heat delivery device, when the device is heated and transfers the heat onto the substrate by direct contact with said substrate, the substance is released onto the substrate. In the embodiments of the present invention, the thermo-releasable substance can be a fragrance and/or an oil. The fragrance provides a perfume or smell that is provided by release of the fragrance in the form of a vapour. The oil is released as a liquid onto the substrate and provides care or a treatment to the substrate.

In one embodiment of the present invention, the thermo-releasable substance can be selected from the group consisting of natural oils, such as argan oil, avocado oil, sunflower oil, jojoba oil, camealia oil; triglycerides; polydimethylsiloxane (PDMS); silicone oils; petroleum oils distillates, such as squalene, squalane, paraffin.

The advantage of the thermo-releasable substance which is an optional component of at least one of the elements of the device according to the present invention, is that no additional application of the substance is required onto the substrate or the device. In other words, because the thermo-releasable substance can be a treating substance, a personal care substance, and/or a substance providing vitamins, minerals, moisture, no prior application of any substance on the substrate or the device is required prior, during or after the use of the device.

According to the present invention, the device is made by injection molding. Accordingly, the first and second elements (A) and (B), respectively, are preferably injection moulded parts. The first and second (A) and (B), respectively, can also be fabricated by 2K moulding, which is a known process per se.

One aspect of the present invention relates to apparatuses comprising the high-heat-delivery device according to the present invention, such as hair styling apparatuses or ironing apparatuses.

The thermoconductivity of the materials is measured as follow. The thermo conductivity measurements are performed using a LFA447 Nanoflash from Netzsch. Samples are acquired from a 120×120×1 mm injection moulded part and are cut from the middle of the moulded part, to avoid possible edge effects, which in turn might influence the thermal conductivity. With this type of geometry the orientation dependent thermal conductivity can generally be described with three parameters: $\Lambda_\perp$, $\Lambda_{//}$ and $\Lambda_\pm$, wherein $\Lambda_\perp$ is the through-plane thermal conductivity, $\Lambda_{//}$ is the in-plane thermal conductivity in the direction of maximum in-plane thermal conductivity, and $\Lambda_\pm$ is the in-plane thermal conductivity in the direction of minimum in-plane thermal conductivity. For the through plane measurements a standard geometry of 10 mm by 10 mm is used with a thickness of 1 mm.

The measuring method uses the so called flash method, in which a material is heated on one side by a flash lamp and its temperature profile is measured on the other side of the material with an Infrared Detector. The material is sprayed black in advance, by use of a graphite spray, in order to acquire a black radiator. From the fit parameters of the measured temperature profile the thermal diffusivity a(T) is calculated, several theoretical models are available. Mostly the so called Cowan-model will be used. For determining the Heat capacity of a sample it is necessary to measure a reference sample (with known thermal properties) in each measuring-cycle as well. Usually Pyroceram 9606 is used. The heat capacity can be calculated by comparing the peak-height of the measured temperature profile of the unknown sample to that of the reference sample. The sample geometry should be as close as possible to the dimensions of the reference sample to get proper results for heat capacity (a reference square sample of 10 mm by 10 mm and with a thickness of 1 mm is used). The density of a sample is determined by measuring length, width and thickness as well as measuring the mass of the sample. From the thermal diffusivity (D), the density (ρ) and the heat capacity (Cp), the thermal conductivity of the material can be determined. For the through plane conductivity ($\Lambda_\perp$) the following formula applies:

$$\Lambda_\perp = a_\perp(T) * \rho * Cp$$

All measurements can be performed in the temperature range from ambient to 300° C.

The invention is further illustrated by examples and comparative experiments.

Materials Used:

Polymers:
PA-6=polyamide-6=Akulon K125 or Akulon K122 of DSM
PA-66=polyamide-6,6=S222 of DSM
PA-46=polyamide-4,6=KS200 of DSM
PA-4,10=polyamide-4,10=EcoPaxx Q150MS of DSM
SPS=Syndiotactic Polystyrene (Idemitsu Chemicals Europe, Xarec 90ZC, Xarec 300ZC, Xarec 142ZE)
PET (5018)=polyethyleneterephthalate=Amite® BAGA 5018 of DSM
PBT-Eco=polybutyleneterephthalate-co-dimerfattyacid 20% DFA of DSM (Melt volume rate=3)
PBT-Eco-2=polybutyleneterephthalate-co-dimerfattyacid 20% DFA of DSM (Melt volume rate=25)
PBT-Eco-3=polybutyleneterephthalate-co-dimerfattyacid 40% DFA of DSM (Melt volume rate=40)
PBT-E=polybutyleneterephthalate-co-polytetramethyleneoxide=Amite® EL740 (Melt volume rate=15)
PBT=polybutyleneterephthalate
PBN-D=polybutylenenaphthanate-co-dimerfattyacid amide=experimental product of DSM
Comp=Compatibilizer for PA with SPS: acid modified poly (phenylene ether) CX-1, FA-PPE (Idemitsu Kosan Co., Ltd)
Thermo Conductive Additives
Expanded Graphite (C-Therm 01)
Expanded Graphite (Ecophit GFG1200)
Carbon black (Timcal Ensaco260G)
Boron Nitride
Oils:
Argan Oil=product code 50 3808 1 of DSM Nutritional Products
Avocado oil=Persea Gratissima oil, Avocado oil RBD, code 266554 of IMCD
Sunflower oil=product code 1665N of Volatile
Camealia Oleifera Seed Oil=Cropure Yuchayu-LQ-(JP), product code SV70391 of
Croda Jojoba oil=Simmondsia Chenensis Seed Oil=Cropure Jojoba of Croda
Other Additives:
Irganox-1076=stabilizer Irganox 1076 of Ciba (BASF)
Irganox-1098=stabilizer Irganox 1098 of Ciba (BASF)
Irganox-B1171=stabilizer Irganox B1171 of Ciba (BASF)
Glass=3B CS173-x11 of Owens Corning
Table 1 shows various compositions according to the invention for which the thermo conductivity was measured.
Preparing Compositions Various compositions were made according to the tables below. The compositions were compounded on twin screw extruders like ZSK30/44D at a processing temperature being at least equal to the highest of Tg or Tm of the polymer of the composition. After the mixing the hot polymer composition string was cooled in a water bath or cooling belt and cut into granules suitable for injection molding.

Injection Molding

Injection molding was performed at an Engel 110, a machine with 110 ton maximum clamping force with a screw diameter of 30 mm. On this machine 120×120×1 mm plates were produced of almost all compositions using plate 120×120×1 mm, for some materials also mechanical test bars were produced on the Engel 110, for these test bars plate ISO 527-1A pr.80*10*4 2v. was used. From the plates plaques were cut to determine the release of the thermo-releasable substance from the composition when used on the straightener. Test bars (dog-bone) were used to produce stress-strain curves of various compositions.

Hair Damage Measurements (Table 3)

The straightener, listed in table 3, was heated to 200° C. Human hair swatches were used as test material being 1.5 cm wide, 23 cm free length held together with by a glued part which was not pulled through the straightener (Klebetresse dicht aus Euro-Natur-Haar, remis, Farbe 6/0, Kerling International Haarfabrik GmbH, item number 826500). A stroke is defined as pulling the hair swatch through the straightener in approximately 10 seconds per pull.

For use with sleeves, 2 sleeves of 1.5 mm thickness were prepared by 2k-molding with the following compositions:
Sleeve 1: Element A=same composition as described in Example 2 of table 1 and
Element B=composition similar to composition 6 of table 2, but without oil;
Sleeve 2: Element A=same composition as described in Example 2 of table 1 and
Element B=same composition as described in Example 6 of table 2, thus with oil.

DSC Measurements

Prior to the measurements the hair swatches were cut into fine snippets (~2 mm) and stored under controlled conditions (~24 hours, 22° C., 55% relative humidity) to ensure invariant water contents. 7 to 10 mg of each sample snippets were weighted and placed in crucibles.

Prior to sealing a crucible, 50 μL of distilled water (pH 6.7) was added, and the sealed crucible was stored overnight (~14 hours preceding the measurement), to allow the hair fibres to wet.

The temperature of the DSC scan ranged from 50 to 180° C. at a heating rate of 10 K/min. For each sample were performed 3 measurements and the peak temperature, Tp, respectively the enthalpy, ΔH, characterising the endothermal effects are reported as mean values. The data were normalized for the weighed amount of snippets. Damaged hair shows a decrease in DSC value compared to the DSC value for hair prior to treatment.

Tensile Strength Method

After the given number of strokes and prior to the tensile measurements, the hair swatches were stored under constant, ambient room conditions (~48 hours, 22° C., 55% relative humidity) to ensure invariant water contents. Then, single hair fibres were crimped in metal-crimps using a press and a stainless steel sample-mounting with a polished top surface. A groove runs down the block with two pockets for locating the crimp tags, the pockets being 30 mm apart and matches up with the sample pads on the scanner.

The dry (22° C., 55% relative humidity) tensile measurements were performed using the Dia-Stron device composed of Miniature Tensile Tester Model 675 (MTT675) and the Fibre Dimensional Analysis Unit Model 765 (FDAS765), both of them being operated by UvWin software. The FDAS765 is a precision tool built around the Mitutoyo LSM500 laser scan micrometer.

A stretching rate of 20 mm/min, Gauge force: 1 gmf., were set as initial conditions.

Damaged hair shows an decrease in tensile strength compared to the tensile strength of the hair before treatment.

TABLE 1

| Experiment no | polymer [wt %] | | polymer [wt %] | | Thermo conductive additive [wt %] | | Glass fiber [wt %] | Additive mix [wt %] | | Additive [wt %] | | Conductivity @ 25° C. [W/(m*K)] | Conductivity @ 200° C. [W/(m*K)] |
|---|---|---|---|---|---|---|---|---|---|---|---|---|---|
| 1 | PA66 (S222) | 49.85 | — | — | C-therm-001 | 30.00 | 15.00 | 1 | 4.65 | irganox 1098 | 0.40 | 1.91 | 1.45 |
| 2 | PA46 | 48.35 | — | — | Ecophit GFG1200 | 30.00 | 15.00 | 2 | 6.15 | irganox 1098 | 0.40 | 2.10 | 1.65 |
| 3 | PA66 (S222) | 49.85 | — | — | Ecophit GFG1200 | 30.00 | 15.00 | 1 | 4.65 | irganox 1098 | 0.40 | 2.12 | 1.24 |
| 4 | PA46 | 24.25 | PA-6 K122 | 24.25 | Ecophit GFG1200 | 30.00 | 15.00 | 3 | 6.00 | Stab pack | 0.40 | 1.6 | 1.38 |

1 4, 5 flow promoter - 0,15 Black pearls 800
2 6 flow promoter - 0,15 Black pearls 800
3 6 flow promoter

TABLE 2

| Experiment no | polymer type [wt %] | | polymer type [wt %] | | oil type [wt %] | | Thermo conductive additive [wt %] | |
|---|---|---|---|---|---|---|---|---|
| 5 | PET BAGA | 43.24 | PBT-Eco | 30.63 | mix 1 | 5.41 | C-Therm-001 | 20.00 |
| 6 | PET BAGA (MB) | 40.84 | PBT-Eco | 34.71 | Avocado | 6.13 | C-Therm-001 | 17.50 |
| 7 | PET BAGA (MB) | 54.70 | PBT-Eco3 PBT-Eco2 50/50 | 22.10 | Avocado | 7.36 | C-Therm-001 | 15.00 |
| 8 | PET BAGA (MB) | 50.50 | PBT-Eco | 27.77 | Avocado | 5.89 | C-Therm-001 | 15.00 |
| 9 | PA-4,10 | 38.94 | SPS Xarec 142ZE | 23.80 | Argan | 9.38 | Ecophit GFG1200 Timcal ensaco260 | 14.25 0.75 |
| 10 | PA-4,10 | 36.35 | SPS Xarec 142ZE | 22.21 | Argan | 8.75 | Boron Nitride | 20.00 |
| 11 | PA-4,10 | 38.94 | SPS Xarec 142ZE | 23.80 | Argan | 9.38 | Ecophit GFG1200 | 15.00 |

TABLE 2-continued

| | | | | | | | |
|---|---|---|---|---|---|---|---|
| 12 | PBT | 53.47 | PBT-Eco2 | 30.30 | Argan | 5.35 | Ecophit GFG1200 10.00 |
| C_1 | PA-4,10 | 51.92 | SPS Xarec 90ZC | 34.62 | none | 0.00 | — 0.00 |
| C_2 | PA-4,10 | 47.20 | SPS Xarec 142ZE | 28.14 | Argan | 11.22 | — 0.00 |
| C_3 | PA-4,10 | 44.40 | PBT-Eco2 | 36.53 | Argan | 8.02 | — 0.00 |

| Experiment no | Glass [wt %] | Other Additive [wt %] | | additive Irganox [wt %] | | Conductivity @ 25° C. [W/(m*K)] | Conductivity @ 200° C. [W/(m*K)] |
|---|---|---|---|---|---|---|---|
| 5 | | | | 1076 | 0.72 | 0.97 | 1.03 |
| 6 | | | | 1076 | 0.82 | 0.67 | 0.68 |
| 7 | | | | 1076 | 0.84 | 0.51 | 0.50 |
| 8 | | | | 1076 | 0.84 | 0.75 | 0.76 |
| 9 | 10 | Comp | 2.16 | B1171 | 0.72 | 0.63 | 0.59 |
| 10 | 10 | Comp | 2.02 | B1171 | 0.67 | 0.45 | 0.40 |
| 11 | 10 | Comp | 2.16 | B1171 | 0.72 | 0.54 | 0.50 |
| 12 | | | | B1171 | 0.88 | 0.50 | 0.62 |
| C_1 | 10 | Comp | 2.60 | B1171 | 0.86 | 0.25 | 0.29 |
| C_2 | 10 | Comp | 2.60 | B1171 | 0.84 | 0.27 | 0.30 |
| C_3 | 10 | color (ultra marine blue 32) | 0.15 | B1171 | 0.90 | 0.28 | 0.30 | mix 1 = 94/2.5/2.5/1 Avocado/Argan/Camelia/Vitamine-E

TABLE 3

Experiments on hair to detect damage

| | Reference | Comp A | Comp B | Comp C | Comp D | Example 1 | Example 2 | Example 3 |
|---|---|---|---|---|---|---|---|---|
| straightener | Hair before treatment | Philips HP8339 straightener | Philips HP8339 | Philips HP8339 | Remington* SH8500 | Philips HP8344 | Philips HP8344 | Philips HP8344 |
| Temperature setting | n.a. | 200° C. | 200° C. | 200° C. | 230° C. | 220° C. | 220° C. | 220° C. |
| sleeve | n.a. | none | none | None, GHD heat protect spray | None | Sleeve 1, no oil | Sleeve 2, with oil | Sleeve 2, with oil |
| Number of strokes | 0 | 5 | 50 | 5 | 50 | 5 | 5 | 50 |
| Tensile strength (N/mm²) | 315 | Nd | 278.9 | 323.8 | 277 | Nd | 301.9 | 317.3 |
| Standard dev. | 54.7 | Nd | 44.8 | 46.7 | 69 | Nd | 49.6 | 58.4 |
| DSC matrix indication (° C.) | 136.4 | 135.3 | 133.5 | 135.7 | | 136.2 | 136.5 | 134.6 |
| DSC helix indication Enthalpy (J/g) | 11.7 | 10.2 | 7.5 | 12.4 | | 11.9 | 11.8 | 12.5 |

Table 1 and 2 show compositions suitable for the high-heat delivery device according to the invention; Comparative examples C_1 to C_3 exhibit less thermo-conductivity due to the absence of thermo-conductive additive.

Table 3 shows that the high-heat delivery device according to the invention comprising a thermo-conductive additive exhibits less hair damage compared to hair straighteners according to the state of the art, thus with an aluminium contact surface. Comparative example C shows that upon application of a protect spray to the hair, the hair also exhibited less damage. The high-heat delivery device according to the invention exhibits a similar result without the need to apply a protect spray onto the hair itself. Especially after 50 strokes, the hair treated with hair strengtheners without a sleeve exhibit much damage, which is visible by the lower values for tensile strength and DSC as compared to untreated hair. The hair treated by the high-heat delivery device according to the invention showed similar values for tensile strength and DSC, thus exemplifying that hardly any damage was observed.

The invention claimed is:

1. A high-heat-delivery device suitable for use in a hair straightener, a hair curling iron or an ironing apparatus and suitable for heat transfer to a substrate by direct contact with said substrate, wherein the device comprises:
   at least one first element having a heat transfer contact surface area, and
   at least one second element having a heat transfer contact surface, wherein
   the at least one first element comprises a thermoconductive thermoplastic polymer composition comprising at least one polymer and a thermoconductive additive, and wherein
   the at least one second element comprises a thermoplastic polymer composition comprising a base polymer and at least one thermo-releasable substance.

2. The device according to claim 1, wherein the device comprises two of the second elements.

3. The device according to claim 2, wherein each second element comprises a thermoconductive additive.

4. The device according to claim 2, wherein each second element is partially embedded in the first element.

5. The device according to claim 2, wherein the heat transfer contact surface area of the at least one first element constitutes 20-80% of a combined heat transfer contact surface area of the at least one first and second elements, and wherein the at least one second element constitutes 80-20% of the combined heat transfer contact surface area of the at least one first and second elements.

6. The device according to claim 2, wherein the thermo-releasable substance comprises a fragrance and/or an oil selected from the group consisting of argan oil, avocado oil, sunflower oil, jojoba oil, camealia oil and mixtures thereof.

7. The device according to claim 1, wherein the at least one first element comprises at least one thermo-releasable substance.

8. The device according to claim 1, wherein the thermoconductive thermoplastic polymer composition comprises a thermoplastic polymer selected from the group consisting of polyamides, polyesters, polyphenylene sulphides, polyphenylene oxides, polysulfones, polyarylates, polyimides, polyetheretherketones and polyetherimides, and mixtures and copolymers thereof.

9. The device according to claim 8, wherein the thermoconductive thermoplastic polymer composition of the first element and/or the thermoplastic polymer composition of the second element comprises a polyester.

10. The device according to claim 9, wherein the thermoplastic polymer composition of the second element comprises a copolyester and/or a polyester blend.

11. The device according to claim 1, wherein the device has a thickness of 0.7 mm to 1.5 mm.

12. The device according to claim 1, wherein the at least one of the first and second elements has a through-plane conductivity which is in a range of 0.3 to 2.5 W/mK at 200° C.

13. The device according to claim 1, wherein at least one of the first and second elements comprises a thermoconductive additive selected from the group consisting of graphite, expanded graphite, carbon black and boron nitride.

14. The device according to claim 1, wherein the thermoplastic thermoconductive thermoplastic polymer composition of the at least one first element (A) comprises:
   (i) 30-85 wt. % of the thermoplastic polymer; and
   (ii) 5-50 wt. % of the thermoconductive additive.

15. The device according to claim 1, wherein the thermoplastic thermoconductive thermoplastic polymer composition of the at least one second element (B) comprises:
   (i) 30-85 wt. % of the base polymer;
   (ii) 5-50 wt. % of a thermoconductive additive; and
   (iii) 1-25 wt. % of the thermo-releasable substance.

16. The device according to claim 1, wherein the first and second elements are injection moulded parts.

17. A method for releasing oil from the device according to claim 1, which comprises heating the thermoconductive composition of the first element to thereby release the thermo-releasable substance of the second element.

18. A hair styling apparatus comprising the high heat delivery device according to claim 1.

19. An ironing apparatus comprising the high heat delivery device according to claim 1.

* * * * *